United States Patent
Raman et al.

(10) Patent No.: US 9,998,425 B2
(45) Date of Patent: Jun. 12, 2018

(54) DYNAMIC BYPASS OF TLS CONNECTIONS MATCHING EXCLUSION LIST IN DPI-SSL IN A NAT DEPLOYMENT

(71) Applicant: SONICWALL US HOLDINGS INC., Santa Clara, CA (US)

(72) Inventors: Raj Raman, San Jose, CA (US); Alex Dubrovsky, San Mateo, CA (US); Akbal Singh Karlcut, Cupertino, CA (US)

(73) Assignee: SonicWALL Inc., Santa Clara, CA (US)

( * ) Notice: Subject to any disclaimer, the term of this patent is extended or adjusted under 35 U.S.C. 154(b) by 330 days.

(21) Appl. No.: 14/606,451

(22) Filed: Jan. 27, 2015

(65) Prior Publication Data

US 2016/0219018 A1 Jul. 28, 2016

(51) Int. Cl.
- *G06F 9/00* (2006.01)
- *G06F 15/16* (2006.01)
- *G06F 17/00* (2006.01)
- *H04L 29/06* (2006.01)
- *H04L 29/08* (2006.01)

(52) U.S. Cl.
CPC ............ *H04L 63/02* (2013.01); *H04L 63/029* (2013.01); *H04L 63/0823* (2013.01); *H04L 63/101* (2013.01); *H04L 63/166* (2013.01); *H04L 67/125* (2013.01); *H04L 67/141* (2013.01); *H04L 67/42* (2013.01); *H04L 69/16* (2013.01)

(58) Field of Classification Search
CPC ... H04L 63/02; H04L 63/029; H04L 63/0823; H04L 63/101; H04L 63/166; H04L 67/141; H04L 67/42; H04L 67/125; H04L 69/16

See application file for complete search history.

(56) References Cited

U.S. PATENT DOCUMENTS

| | | |
|---|---|---|
| 6,981,141 B1 | 12/2005 | Mahne et al. |
| 7,023,997 B1 | 4/2006 | Schier |
| 7,369,334 B2 | 5/2008 | Yu |
| 8,307,422 B2 | 11/2012 | Varadhan |
| 8,316,435 B1 | 11/2012 | Varadhan |
| 8,713,627 B2 | 4/2014 | Varadhan et al. |
| 8,724,633 B2 | 5/2014 | Yu |

(Continued)

FOREIGN PATENT DOCUMENTS

WO WO 2015/175007 11/2015

OTHER PUBLICATIONS

Dierks et al, "The TLS Protocol Version 1.0", Jan. 1999, pp. 31-35, obtained from https://www.ietf.org/rfc/rfc2246.txt.*
PCT Application No. PCT/US2014/045312 International Search Report and Written Opinion dated Nov. 7, 2014.
U.S. Appl. No. 14/587,947 Final Office Action dated Apr. 28, 2016.

(Continued)

*Primary Examiner* — Linglan Edwards
*Assistant Examiner* — Forrest Carey
(74) *Attorney, Agent, or Firm* — Polsinelli LLP

(57) ABSTRACT

The present invention provides the initiation of a transport layer security (TLS) session between a client device and a server using a firewall without interruption. The present invention holds a TLS hello message received from the client device until after the server has been validated. A firewall consistent with the present invention does not interrupt a transport layer control (TCP) connection that was established between the client device and the firewall before the TLS hello message was received by the firewall.

19 Claims, 5 Drawing Sheets

(56) References Cited

U.S. PATENT DOCUMENTS

| | | | |
|---|---|---|---|
| 8,730,844 B2 | 5/2014 | Johnson et al. | |
| 8,782,408 B2 | 7/2014 | Fielder | |
| 8,789,135 B1 | 7/2014 | Pani | |
| 8,856,869 B1* | 10/2014 | Brinskelle | H04L 63/08 |
| | | | 726/12 |
| 8,934,625 B2 | 1/2015 | Fielder | |
| 9,020,149 B1 | 4/2015 | Golwalkar | |
| 9,107,048 B2 | 8/2015 | Haddad | |
| 9,237,129 B2 | 1/2016 | Ling | |
| 9,503,425 B2 | 11/2016 | Ling | |
| 9,537,872 B2 | 1/2017 | Liu | |
| 9,800,417 B2 | 10/2017 | Liu | |
| 9,871,764 B2 | 1/2018 | Ling | |
| 9,912,484 B2 | 3/2018 | Liu | |
| 2004/0034771 A1 | 2/2004 | Edgett et al. | |
| 2004/0196979 A1 | 10/2004 | Cheng et al. | |
| 2004/0240669 A1 | 12/2004 | Kempf et al. | |
| 2006/0077908 A1 | 4/2006 | Park et al. | |
| 2006/0190612 A1* | 8/2006 | Kahol | H04L 69/16 |
| | | | 709/230 |
| 2007/0011734 A1 | 1/2007 | Balakrishnan et al. | |
| 2007/0211892 A1 | 9/2007 | Ohkoshi | |
| 2007/0245401 A1 | 10/2007 | Brabson et al. | |
| 2008/0120236 A1 | 5/2008 | Faith et al. | |
| 2008/0181403 A1 | 7/2008 | Sakamoto | |
| 2008/0263353 A1 | 10/2008 | Droms et al. | |
| 2008/0320582 A1 | 12/2008 | Chen et al. | |
| 2009/0025077 A1 | 1/2009 | Trojanowski | |
| 2009/0119407 A1 | 5/2009 | Krishnan | |
| 2009/0204691 A1 | 8/2009 | Xia et al. | |
| 2010/0172257 A1 | 7/2010 | Yu | |
| 2010/0175123 A1* | 7/2010 | Karino | H04L 29/12377 |
| | | | 726/12 |
| 2010/0202345 A1 | 8/2010 | Jing et al. | |
| 2010/0299529 A1 | 11/2010 | Fielder | |
| 2010/0318784 A1* | 12/2010 | Rao | H04L 63/0281 |
| | | | 713/151 |
| 2011/0055572 A1 | 3/2011 | Vogt et al. | |
| 2011/0161661 A1 | 6/2011 | Medvinsky et al. | |
| 2011/0255445 A1 | 10/2011 | Johnson et al. | |
| 2012/0005480 A1 | 1/2012 | Batke et al. | |
| 2013/0163426 A1 | 6/2013 | Beliveau et al. | |
| 2013/0276092 A1 | 10/2013 | Sun et al. | |
| 2013/0343295 A1 | 12/2013 | Deo | |
| 2014/0082204 A1* | 3/2014 | Shankar | H04L 63/166 |
| | | | 709/227 |
| 2014/0115120 A1 | 4/2014 | Li et al. | |
| 2014/0013324 A1 | 7/2014 | Zhang et al. | |
| 2015/0334090 A1 | 11/2015 | Ling | |
| 2016/0094518 A1 | 3/2016 | Ling | |
| 2016/0119287 A1* | 4/2016 | Khazan | H04L 63/0281 |
| | | | 726/12 |
| 2016/0127317 A1* | 5/2016 | Ardeli | H04L 63/0236 |
| | | | 726/14 |
| 2016/0191543 A1 | 6/2016 | Liu | |
| 2017/0118027 A1 | 4/2017 | Liu | |
| 2017/0142070 A1 | 5/2017 | Ling | |
| 2017/0353317 A1 | 12/2017 | Liu | |

OTHER PUBLICATIONS

U.S. Appl. No. 14/587,947 Office Action dated Jan. 6, 2016.
U.S. Appl. No. 15/397,573 Office Action dated Feb. 9, 2017.
U.S. Appl. No. 15/397,573, Yun Feng Liu, Secure Neighbor Discovery (SEND) Using Pre-Shared Key, filed Jan. 3, 2017.
U.S. Appl. No. 15/358,928 Office Action dated May 19, 2017.
U.S. Appl. No. 15/684,828 Office Action dated Sep. 21, 2017.
U.S. Appl. No. 15/858,623 Office Action dated Mar. 5, 2018.

* cited by examiner

DYNAMIC BYPASS OF TLS CONNECTIONS MATCHING EXCLUSION LIST IN DPI-SSL IN A NAT DEPLOYMENT

BACKGROUND OF THE INVENTION

Field of the Invention

The present invention is generally related to establishing a transport layer security (TLS) session without interruption. More specifically, the present invention relates to a client device communicating with a server through a firewall without interrupting an initial transport control protocol (TCP) session.

Description of the Related Art

Servers and client devices connecting to servers over computer networks are often protected from cyber-attacks by a firewall. Firewalls commonly intercept messages and inspect them for cyber-threats. In certain instances, a firewall also stops intercepting and inspecting messages between a client device and a server after the firewall determines that the server does not pose a threat to the client device, and that the client device does not pose a threat to the server.

Firewalls in modern computer networks validate the credentials of servers and client devices before allowing them to communicate directly. An example of direct communications between a client device and a server is a transport layer security (TLS) session where a firewall stops intercepting and inspecting messages between the client device and the server.

Messages encrypted over a TLS session are usually inspected by the firewall using deep packet inspection over a secure socket layer (DPI-SSL) software. When inspecting messages using DPI-SSL software, the firewall separates and parses information contained within messages received by the firewall. By inspecting data within the messages cyber-threats such as computer viruses or worms are identified and blocked. DPI-SSL is used to inspect messages received from client devices or servers that are more likely to contain a cyber-threat.

Firewalls also hide from the server the internet protocol (IP) address of client devices that communicate with the server. To accomplish this firewalls communicate with servers using network address translation (NAT). NAT abstracts the real IP address of the client from the server by assigning a configured outbound IP address and a random TCP port numbers on a TCP connection between the firewall and server. Typically, a client device only sees TCP packets including a server IP address and server TCP port number. Because of this, the client has no idea that the connection is going through a NAT'd firewall, and the server only sees the connection coming from the firewall without being aware of the actual client IP address of the client device or the TCP port used to communicate with the client device. Communications between the firewall and the server use network addresses and port numbers that are virtual, random, and that are dynamically assigned. For example, when establishing a transfer control protocol (TCP) connection between a firewall and a server, NAT designates a configured NAT IP address, assigns a dynamically obtained NAT TCP port number. These NAT address and NAT port numbers are unique and are associated with a specific TCP connection. The NAT TCP port number is usually picked from a large range of valid TCP port numbers. The source/client IP address and source/client TCP port number are mapped to the NAT IP address and NAT TCP port number in the TCP packets from client that are sent to the firewall. Likewise, the destination/NAT IP address and destination/NAT TCP port number in the packets from the server to the firewall are mapped to the client IP address and client TCP port number respectively. These mappings are associated with a particular client-server TCP connection and are stored in the firewall. Each time a new TCP connection is established, new NAT port numbers are assigned to the new TCP session.

After a firewall has established a TLS session, the firewall passes through the messages associated with the TLS session without inspecting them for cyber-threats using a direct point to point connection through the firewall. This direct point to point connection is commonly referred to as a tunnel through the firewall. In certain instances, the messages tunneled through the firewall are forwarded according to a NAT mapping that hides real IP address of the client device from the server.

Before a client device attempts to initiate a TLS session with a server, the client device must establish a TCP connection between the client device and a firewall, and the firewall must establish a TCP connection between the firewall and the server.

When establishing a TCP connection between a client device and a firewall, the client device first transmits to the firewall a TCP synchronize message, next the client device receives a TCP synchronize acknowledgement message from the firewall, and then the client device transmits a TCP acknowledgment to the firewall. Establishing the TCP connection between the firewall and the server includes a series of similar steps, where the firewall transmits a TCP synchronize message to the server, the firewall receives a TCP synchronize acknowledgement message from the server, and the firewall transmits a TCP acknowledgement to the server. After a TCP connection between the client device and the firewall is established, the client device initiates a TLS handshake by sending a TLS hello message to the firewall that addresses the server.

After the TLS client hello message is sent to the firewall, the firewall obtains the DNS name of the server from the TLS client hello message, when it is available. The DNS name of server is part of a TLS extension in the TLS client hello message is optional, and is therefore not always included in a TLS client hello message. If the domain name of server is available in the TLS client hello, the firewall compares information in the client hello with information stored in memory at the firewall. The information stored at the firewall is usually stored in either a user defined exclusion list, a dynamic exclusion list, or in both. The TLS handshake between the firewall and the server enforces local policies for TLS connections, where servers are identified using a domain name service (DNS) hostname provided by the server in the server certificate. The DNS hostname is compared against the user defined exclusion list or the dynamic exclusion list to determine whether subsequent TCP messages from the client device addressing the server should be bypassed from interception and inspection by deep packet inspection secure socket layer (DPI-SSL) software. Once it is determined that subsequent TCP messages should be bypassed from interception and inspection, legacy implementations terminate the TCP connection between the client device and firewall because the firewall has already initiated a TLS session with the server for this client connection. The firewall then adds the certificate information to an entry in the dynamic exclusion list. Firewalls terminate the TCP connection between the client and the firewall because their design expects that a user of a client device will either refresh the previous TCP connection or establish a new TCP connection between the client and the firewall. Once a TCP connection between the client device and firewall is refreshed or a new TCP connection is established, legacy firewall implementations use the new entry in the dynamic exclusion list to determine if the connection should be intercepted or tunneled prior to establishing a TLS session with the server.

After the TCP connection between the client device and the firewall is terminated, a user of the client device experiences delay. This is because the client device must refresh the session or initiate a new TCP connection. In certain instances applications installed on the user device experience a fatal error when the initial TCP connection is interrupted. When an application program terminates or closes due to a fatal error, the user of the client device must also re-start the application before a TLS session can be initiated. By interrupting the TLS session between the client device and the firewall, a user of the client device is subjected to unnecessary delays caused by the firewall terminating the client device/firewall TCP connection.

What is needed is a system and a method for initiating a TLS session that does not terminate an existing TCP connection between a client device and a firewall.

SUMMARY OF THE PRESENTLY CLAIMED INVENTION

Figure 1:
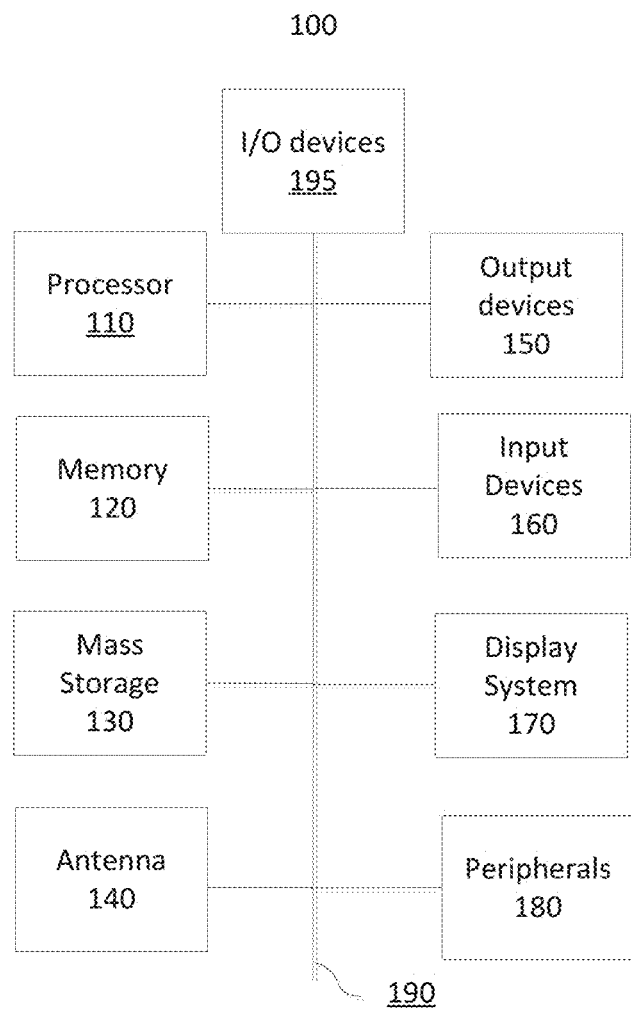
FIG. 1 illustrates a block diagram of a computing device that may be used to implement various embodiments of the present invention.

The present invention initiates a TLS session without interrupting an initial TCP connection between a client device and a firewall. Firewalls built according to the present invention initiate a TLS session flawlessly because they do not interrupt the TCP connection between the client device and a firewall. The present invention initiates a TLS session after a first TCP session has been initiated between a client device and a firewall, and after a first TCP session has been initiated between the firewall and a server by holding the TLS hello message in the firewall.

The initiation of a TLS session between a client device and a server begins with a client device sending a TLS hello message to the server through a firewall. The firewall holds the TLS hello message until after the firewall validates the credentials of the server. While holding the TLS hello message from the client device, the firewall initiates a TLS session with the server by sending a new TLS client hello message to the server. The server then responds by sending a TLS server hello message, and a TLS server certificate message to the firewall. The new TLS client hello message includes information that is similar to, yet not identical to information included in the TLS client hello message held by the firewall. The server certificate message received by the firewall includes a "server certificate," and the server certificate includes information that will be used by the firewall to validate the server.

After the firewall receives the server certificate from the server, the firewall validates the server by comparing information in the retrieved server certificate with information stored at the firewall. The information stored in the firewall is used to validate the server by comparing the information in the server certificate with a trusted well-known set of certificate authority (CA) certificates stored in the firewall. When the information in the server certificate matches the information stored at the firewall, the firewall determines that the server is a trusted server.

After validating that the server is a trusted server, the firewall classifies the connection as inspect (also known as intercept) or bypass (also known as tunnel). The information stored at the firewall is usually stored in either a user defined exclusion list, a dynamic exclusion list, or in both.

In the case of bypass, the firewall initiates a second TCP connection with the server. After establishing a second TCP connection between the firewall and the server, the firewall forwards the original TLS hello message received from client to server. By holding the TLS hello message until after the server is validated the TCP connection between the client device and the firewall is not interrupted. Since the TCP connection between the client device and the firewall is not interrupted, a user of the client device no longer experiences delays when initiating a TLS session. The present invention, therefore, improves the efficiency of establishing a TLS session by not interrupting a TCP session between the client device and the firewall.

The client device is not aware that the firewall initiated a TLS session with the server using the new TLS client hello message, and the client device is not aware that the firewall has validated the credentials of the server while holding the original TLS client hello message.

After the TLS session between the client device and the server is established, all subsequent TCP messages between the client device and the server are passed through the firewall without being intercepted or inspected by the firewall. The firewall, thus, "transparently passes through" TCP messages from the client device addressing the server, and transparently passes through TCP messages from the server addressing the client device. The terms: transparently passes messages, transparently passes through messages, transparently passing messages, transparently passing through messages, or bypassed messages used in this disclosure refer to messages that are received over a first port at the firewall and are transmitted over another port at the firewall without being intercepted or inspected by the firewall. The present invention initiates a TLS session between the client device and the server without interrupting the initial TCP connection between the client device and the firewall even when the TLS client hello message received from the client device does not include the DNS name of server, a common name identifying the server, or a domain name.

DETAILED DESCRIPTION

FIG. 1 is a block diagram of a device for implementing the present technology. FIG. 1 illustrates an exemplary computing system 100 that may be used to implement a computing device with the present technology. Note that FIG. 1 is exemplary and that all features shown in the figure may not be included in a firewall implementing the present invention. System 100 of FIG. 1 may be implemented in the contexts of the likes of clients and servers. The computing system 100 of FIG. 1 includes one or more processors 110 and memory 120. Main memory 120 may store, in part, instructions and data for execution by processor 110. Main memory 120 can store the executable code when in operation. The system 100 of FIG. 1 further includes mass storage 130, which may include resident mass storage and portable storage, antenna 140, output devices 150, user input devices 160, a display system 170, peripheral devices 180, and I/O devices 195.

The components shown in FIG. 1 are depicted as being connected via a single bus 190. However, the components may be connected through one or more data transport means. For example, processor unit 110 and main memory 120 may be connected via a local microprocessor bus, and the storage 130, peripheral device(s) 180, and display system 170 may be connected via one or more input/output (I/O) buses.

Mass storage device 130, which may include mass storage implemented with a magnetic disk drive, an optical disk drive, FLASH memory, or be a portable USB data storage device. Mass storage device 130 can store the system software for implementing embodiments of the present invention for purposes of loading that software into main memory 120. The system software for implementing embodiments of the present invention may be stored on such a portable medium and input to the computer system 100 via the portable storage device.

Antenna 140 may include one or more antennas for communicating wirelessly with another device. Antenna 140 may be used, for example, to communicate wirelessly via Wi-Fi, Bluetooth, with a cellular network, or with other wireless protocols and systems. The one or more antennas may be controlled by a processor 110, which may include a controller, to transmit and receive wireless signals. For example, processor 110 executes programs stored in memory 120 to control antenna 140, transmit a wireless signal to a cellular network, and receive a wireless signal from the cellular network.

The system 100 as shown in FIG. 1 includes output devices 150 and input devices 160. Examples of suitable output devices include speakers, printers, and monitors. Input devices 160 may include a microphone, accelerometers, a camera, and other devices. Input devices 160 may also include an alpha-numeric keypad, such as a keyboard, for inputting alpha-numeric and other information, or a pointing device, such as a mouse, a trackball, stylus, or cursor direction keys. I/O devices 195 include network interfaces, and touch screens. Network interfaces used the present invention may be any computer network (wired or wireless) known in the art, including, yet are not limited to Ethernet, or 802.11.

Display system 170 may include a liquid crystal display (LCD), LED display, a plasma display, or be another suitable display device. Display system 170 receives textual and graphical information, and processes the information for output to the display device.

Peripherals 180 may include any type of computer support device to add additional functionality to the computer system. For example, peripheral device(s) 180 may include a modem or a router.

The components contained in the computer system 100 of FIG. 1 are those typically found in computing system, such as but not limited to a desktop computer, laptop computer, notebook computer, netbook computer, tablet computer, smart phone, personal data assistant (PDA), or other computer that may be suitable for use with embodiments of the present invention and are intended to represent a broad category of such computer components that are well known in the art. Thus, the computer system 100 of FIG. 1 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

Figure 2:
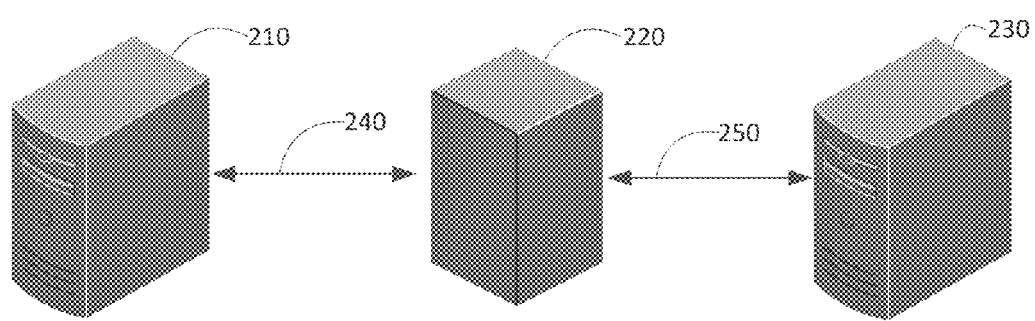
FIG. 2 illustrates a client device, a firewall, and a server communicating with each other.

FIG. 2 illustrates a client device, a firewall, and a server communicating with each other. Communications 240 in the figure are communications 240 between the client device 210 and the firewall 220. Communications 250 are communications between the firewall 220 and the server 230 using a wired or a wireless computer network. Communications 240/250 are transmitted over a network interface.

Figure 3:
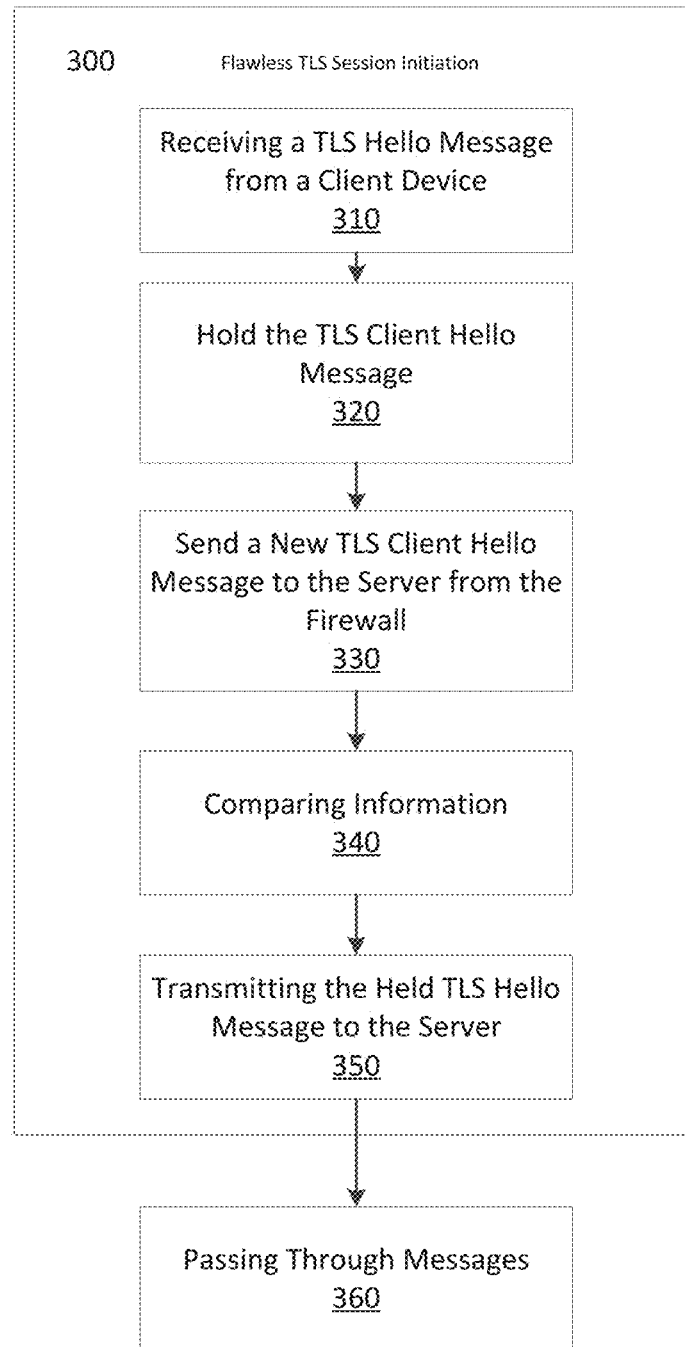
FIG. 3 illustrates a flow chart of a method for initiating a transport layer security (TLS) session in a flawless manner.

FIG. 3 illustrates a flow chart of a method for initiating a transport layer security (TLS) session in a flawless manner. A flawless TLS session initiation 300 includes steps 310, 320, 330, 340, and 350 in the figure. In step 310 the firewall receives a TLS hello message from a client device, and next in step 320 the firewall holds the TLS hello message. In step 330, the firewall initiates a TLS session with the firewall by sending a new TLS client hello message to the server. This new TLS client hello message is similar to, yet is not identical to the TLS client hello message being held by the firewall. Furthermore the client device is not aware that the firewall performs this step. After transmitting the new TLS client hello message to the server, the server responds (this step is not depicted in FIG. 3) by sending a server certificate to the firewall, and information in the server certificate is used by the firewall to validate the server.

In step 340 of the flow chart, the firewall compares information retrieved from the server with information stored at the firewall when authenticating that the server is a trusted server. In step 350 the firewall transmits the held TLS hello message to the server when initiating a TLS session between the client device and the server. Finally, in step 360 of the flow chart, messages transmitted between the client device and the firewall are transparently passed through the firewall without interception or inspection.

Figure 4:
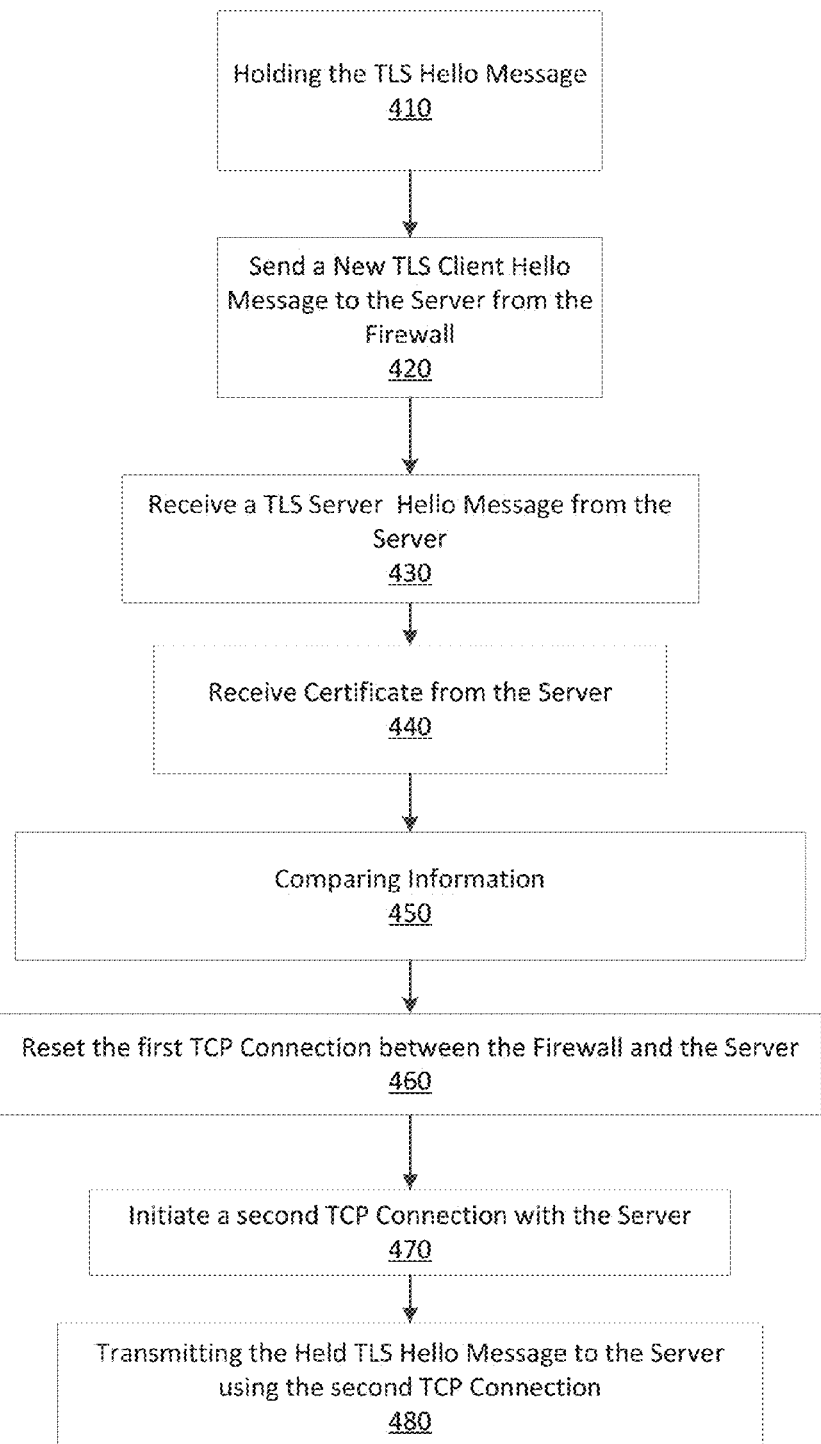
FIG. 4 illustrates a flow chart of communications between a firewall and a server when validating that the server is a trusted server, and when initiating a second transport control protocol (TCP) session between the firewall and the server.

FIG. 4 illustrates a flow chart of communications between a firewall and a server when validating that the server is a trusted server, and when initiating a second transport control protocol (TCP) connection between the firewall and the server. FIG. 3 and FIG. 4 include the corresponding steps of holding a TLS hello message 320 & 410, sending a new TLS client hello message from the firewall to the server 330 & 420, comparing information 340 & 450, and transmitting the held TLS hello message 350 & 480 to the server.

The flow chart in the figure begins with step 410, holding the TLS hello message. In step 420, the firewall initiates a TLS session with the firewall by sending a new TLS client hello message to the server. As in FIG. 3, this new TLS client hello message is similar to, yet is not identical to the TLS client hello message being held by the firewall. Furthermore the client device is not aware that the firewall performs this step.

In step 430 the firewall receives a TLS server hello message from the server, and in step 440 the firewall receives the server certificate from the server. In step 450 the firewall compares information in the server certificate with information stored at the firewall when validating that the server is a trusted server. In step 460 a first TCP connection between the firewall and the server is reset, in step 470 a second TCP connection is initiated between the firewall and the server, and in step 480 the held TLS hello message is transmitted to the server using the second TCP connection.

Steps 340/450 in FIGS. 3-4 compare information contained in the certificate requested from and retrieved by the firewall with information stored at the firewall. Information compared in step 340 & 450 when validating the server include, yet are not limited to the name of a server, the DNS hostname of the server, a domain name associated with the server, and a common name. In instances where a TLS session previously interrupted is re-established, the firewall will use information stored in a peer certificate on the server. In these embodiments, the peer certificate will include less information than the information contained in the certificate that was used to originally validate the server.

Comparison information stored at the firewall will be stored in memory in a user defined exclusion list, a dynamic exclusion list, or in both the user defined exclusion list and the dynamic exclusion list. When information in the user defined exclusion list corresponds to information in the certificate, that information will be copied to the dynamic exclusion list. In certain embodiments, the dynamic exclusion list is a data structure that stores or deletes information according to administration rules of the firewall. An example of such an administrative rule is when the firewall deletes an entry in the dynamic exclusion list after a user terminates a TLS session, and does not refresh that session for more than 24 hours.

In certain embodiments of the present invention, the firewall hides a real internet protocol (IP) address of client devices from the server that communicate with the server. To accomplish this, the firewall translates network addresses using a technique that is commonly known as network address translation (NAT). NAT abstracts the real IP address of the client from the server by assigning a configured outbound IP address and a random TCP port numbers on TCP connection between the firewall and server.

Communications between the firewall and the server use network addresses and port numbers that are virtual, random, and that are dynamically assigned. For example, when establishing a transfer control protocol (TCP) connection between a firewall and a server, NAT designates a configured NAT IP address, assigns a dynamically obtained NAT TCP port number. These NAT address and NAT port numbers are unique and are associated with a specific TCP connection. The source/client IP address and source/client TCP port number are mapped to the NAT IP address and NAT TCP port number in the TCP packets from client that are sent to the firewall. Likewise, the destination/NAT IP address and destination/NAT TCP port number in the packets from the server to the firewall are mapped to the client IP address and client TCP port number respectively. These mappings are associated with a particular client-server TCP connection and are stored in the firewall. Each time a new TCP connection is established, new NAT addresses and port numbers are assigned to the new TCP session.

The first TCP connection established between the firewall and the server communicates over a first port of the firewall, and a port of the server. The second TCP connection established between the firewall and the server communicates over a second port of the firewall, and a port of the server. The firewall will store in memory an association that identifies which specific port of the firewall is associated with the specific port of the server for a particular TCP connection. When a TCP connection is reset the association will be cleared. Data structures for storing these associations in memory are not limited to a hash table, a linked list, or a tree. Associations that are stored in these data structures also associate a network address of the firewall with a port number at the firewall, and associate a network address of the server with a port number at the server when TCP connections are made dynamically.

Figure 5:
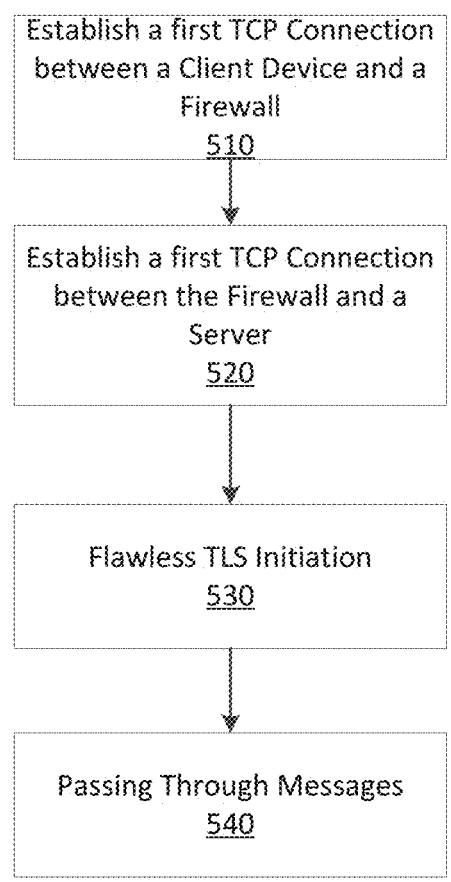
FIG. 5 illustrates a flow chart of the firewall interacting with a client device and a server when establishing a TLS session.

FIG. 5 illustrates a flow chart of the firewall interacting with a client device and a server when establishing a TLS connection. The figure begins with step 510, this step establishes a first TCP connection between a client device and a firewall. Next in step 520, a first TCP connection is established between the firewall and a server. Then in step 530 a TLS session is initiated flawlessly using the flawless TLS initiation 300 described in respect to FIG. 3. The term "flawlessly" means that a currently established TCP session or connection between the client device and the firewall will not be interrupted when initiating a TLS session.

After initiating the TLS session flawlessly, the firewall in step 540 passes messages between the client device and the server without intercepting or inspecting those messages using. Messages passed though between the client device to the server are "tunneled" through the firewall without inspection. Network tunneling is the passing of private information over a public network without exposing the private information to inspection by the public.

The firewall in the present invention acts as a proxy-less DPI-SSL inspection engine where messages between the client device and the server do not use an internet protocol address of the firewall. Messages using TCP connections that are not currently being passed through are inspected, and messages using TCP connections that are currently being bypassed (passed through) are not inspected. When inspecting messages using DPI-SSL software, the firewall separates and parses information contained within messages received by the firewall. By inspecting data within the messages, cyber-threats such as computer viruses or worms are identified and blocked.

Client devices are known to re-transmit TLS hello messages when they have not received a response to a previous TLS hello message. In the present invention, when a re-transmitted TLS hello message corresponds to a TLS hello message that is currently being held by the firewall is received, the firewall will overwrite the previous TLS hello message with the later TLS hello message and hold the re-transmitted TLS hello message.

In certain instances, a TLS session is re-established with a different server with the same common name, a domain name service (DNS) hostname, that serves the same content as the server that a client device originally connected to. In such an instance, the different server is addressed using an IP address of the different server. In other instances, a TLS session is re-established from a different client device where a TLS client hello message from the different client device includes a common name associated with the server, a domain name service (DNS) hostname, or a domain name. In other circumstances, a server may always re-validate the credentials of the server and the client device whenever a TLS session is re-initiated.

While various embodiments have been described above, it should be understood that they have been presented by way of example only, and not limitation. The description are not intended to limit the scope of the presently claimed invention or to limit the scope of embodiments of the present invention. The present descriptions are intended to cover alternatives, modifications, and equivalents consistent with the spirit and scope of the disclosure.

The invention claimed is:

1. A method for establishing a transport layer security (TLS) session, the method comprising:
receiving at a firewall a first TLS hello message transmitted from a client device;

holding the first TLS hello message at the firewall until a server addressed in the first TLS hello message has been validated, wherein validation of the server includes:
    transmitting a second TLS hello message from the firewall to the server, wherein the second TLS hello message transmitted from the firewall to the server is not identical to the first TLS hello message transmitted from the client device, and
    comparing information in a certificate received from the server with information stored at the firewall;
overwriting the first TLS hello message held at the firewall in response to an additional TLS hello message being received at the firewall while the first TLS hello message is being held;
holding the additional TLS hello message at the firewall until after the server addressed in the first TLS hello message has been validated;
transmitting the additional TLS hello message to the server in response to the first TLS hello message having been overwritten and upon validating the server, wherein the additional TLS hello message transmitted to the server is transmitted in response to the first TLS hello message held at the firewall having been overwritten, and wherein the transmission initiates a TLS session without interrupting a transmission control protocol (TCP) connection between the client device and the firewall; and
transparently passing subsequent TCP messages transmitted between the client and the server after validating the server.

2. The method of claim 1, wherein prior to receiving the first client hello message the firewall:
    receives a first TCP synchronize message from the client device;
    transmits a first TCP synchronize message to the server;
    receives a first TCP synchronize acknowledgement message from the server;
    transmits a first TCP synchronize acknowledgement message to the client device;
    receives a first TCP acknowledgement from the client device, wherein the TCP acknowledgement received from the client device establishes a first TCP connection between the client device and the firewall; and
    transmits a first TCP acknowledgement to the server, wherein the transmitting of the first TCP acknowledgement to the server establishes a first TCP connection between the firewall and the server.

3. The method of claim 2, wherein the messages received from the client device do not provide an internet protocol (IP) address of the firewall, and the first client hello message does not include at least one of a domain name service (DNS) hostname, a common name associated with the server, and a domain name.

4. The method of claim 1, wherein prior to validating the certificate the firewall:
    inspects the received TLS client hello message by a deep packet inspection secure socket layer (DPI-SSL) parser;
    receives a TLS server certificate message from the server; and
    inspects the received TLS server certificate message by the DPI-SSL parser.

5. The method of claim 1, wherein prior to the transmission to the server, the firewall:
    resets a first TCP connection between the firewall and the server, wherein the resetting of the first TCP connection terminates the first TCP connection between the firewall and the server;
    transmits a second TCP synchronization message to the server;
    receives a second TCP synchronization acknowledgement from the server; and
    transmits a second TCP acknowledgement to the server, wherein the transmitting of the second TCP acknowledgement message to the server establishes a second TCP connection between the firewall and the server.

6. The method of claim 5, wherein communications between the firewall and the server are communicated over a TCP port of the firewall and a TCP port of the server on an outbound interface of the firewall according to an network address translation (NAT) mapping that abstracts the real IP address of the client from the server.

7. The method of claim 6, wherein:
    the TCP port of the firewall and the TCP port of the server are stored in a first association that binds the TCP port of the firewall and the TCP port of the server with a first TCP connection between the firewall and the server,
    the first association stored in the firewall is deleted when the first TCP connection is terminated, and
    a second TCP port of the firewall and the TCP port of the server are stored in a second association that binds the second TCP port of the firewall and the TCP port of the server with the second TCP connection between the firewall and the server.

8. The method of claim 7, wherein the first association and the second association are stored in a hash table.

9. The method of claim 1, wherein the information compared when validating the server is at least one of a domain name service (DNS) hostname, a common name, and a domain name.

10. The method of claim 1, further comprising classifying the TLS session between the client device and the server as bypass before the TCP messages between the client device and the server are transparently passed between the client device and the server.

11. The method of claim 1, wherein the information compared when validating the server is stored in at least one of a dynamic exclusion list and a user defined exclusion list.

12. The method of claim 11, further comprising adding the information compared when validating the server to the dynamic exclusion list when the information is not currently in the dynamic exclusion list.

13. The method of claim 11, wherein the dynamic exclusion list is a data structure stored in a local cache memory in the firewall.

14. The method of claim 11, further comprising:
    receiving a subsequent TLS client hello message after the TLS session has been interrupted, the subsequent TLS client hello message received from at least one of the client device and another client device, and the subsequent TLS client hello message including the common name and an IP address of the server;
    identifying that the common name is listed in the at least one of the dynamic exclusion list and the user defined exclusion list, wherein the identification re-initiates the TLS session; and
    transparently passing TCP messages transmitted between the at least one of the client device and the another client device and the server after identifying that the common name is listed in the at least one of the dynamic exclusion list and the user defined exclusion list.

15. The method of claim 11, further comprising:
receiving a subsequent TLS client hello message after the TLS session has been interrupted from at least one of the client device and another client device, the subsequent TLS client hello message including the common name and a different server IP address;
identifying that the common name is listed in the at least one of the dynamic exclusion list and the user defined exclusion list, wherein the TLS session is re-initiated; and
transparently passing TCP messages transmitted between the at least one of the client device and the another client device and the server after identifying that the common name is listed in the dynamic exclusion list.

16. The method of claim 11, further comprising:
receiving a subsequent TLS client hello message on a subsequent new TCP connection between at least one of the client device and another client device, the subsequent TLS client hello message including the common name;
holding the subsequent TLS hello message at the firewall until a server addressed in the subsequent TLS hello message has been validated, wherein validation of the server includes:
 transmitting another TLS hello message from the firewall to the server;
 comparing information in a certificate received from the server with information stored at the firewall;
 transmitting the subsequent TLS hello message to the server, wherein
 transmitting the subsequent TLS hello message initiates a TLS session without interrupting a transmission control protocol (TCP) connection between the client device and the firewall; and
transparently passing subsequent TCP messages transmitted between the client and the server after validating the server.

17. The method of claim 1, further comprising:
classifying the TLS session between the client device and the server as bypass prior to transparently passing the subsequent TCP messages between the client and the server,
storing the compared information when validating the server in at least one of a dynamic exclusion list and a user defined exclusion list, and
copying the compared information to the dynamic exclusion list after classifying the TLS session to bypass when the information is not currently in the dynamic exclusion list.

18. The method of claim 1, wherein the passed through TCP messages are forwarded through the firewall between the client and the server.

19. The method of claim 1, further comprising comparing information in the transmitted message with the information in the certificate, wherein the transmitted message is validated when the information in the additional client hello message matches the information in the certificate.

* * * * *